United States Patent [19]
Ru et al.

[11] Patent Number: 5,446,589
[45] Date of Patent: Aug. 29, 1995

[54] INTERFERENCE DEVICE AND METHOD FOR OBSERVING PHASE INFORMALITIES

[75] Inventors: Qing X. Ru, Namegawa; Junji Endo, 3-3-33, Tsurumai, Sakado-shi, Saitama 350-02; Akira Tonomura, 2-19-5, Kaedegaoka, Hatoyama-machi, Hiki-gun, Saitama 350-03, all of Japan

[73] Assignees: Research Development Corporation of Japan, Tokyo; Junji Endo; Akira Tonomura, both of Saitama, all of Japan

[21] Appl. No.: 103,682

[22] Filed: Aug. 10, 1993

[30] Foreign Application Priority Data

Aug. 11, 1992 [JP] Japan .................................. 4-213943

[51] Int. Cl.⁶ .............................................. G02B 26/06
[52] U.S. Cl. ..................................... 359/577; 250/307
[58] Field of Search .................. 250/311, 307; 359/28, 359/559, 561, 564, 568, 577

[56] References Cited

U.S. PATENT DOCUMENTS

| | | | |
|---|---|---|---|
| 4,038,543 | 7/1977 | Krisch et al. | 250/307 |
| 4,935,625 | 6/1990 | Hasegawa et al. | 250/306 |
| 5,298,747 | 3/1994 | Ichikawa et al. | 250/306 |
| 5,300,776 | 4/1994 | Krivanek | 250/307 |

*Primary Examiner*—Frank Gonzalez
*Attorney, Agent, or Firm*—Armstrong, Westerman, Hattori, McLeland & Naughton

[57] ABSTRACT

An interference device and method for observing phase information, using electron or other waves with the amplitude difficult to split by a half mirror. Using an interference device comprising in combination two scattering films A1 and A2 capable of scattering incident waves randomly, first lens systems B1 and B2 that are located between said two scattering films to form the image of one scattering film A1 on the other scattering film A2, a second lens system B3 for forming on an observation surface C the image of a specimen 2 located at a position where a component going straight through said one scattering film is converged in a spot form through said first lens system or a part thereof, and means for recording an interference pattern formed on the observation surface C, an interference pattern is detected while the specimen 2 is inserted in the arrangement, and an interference pattern is detected while the specimen 2 is removed from the arrangement, so that the difference between both the interference patterns, or the sum or product of them, can be found to observe the phase information of the specimen directly as interference fringes.

4 Claims, 4 Drawing Sheets

INTERFERENCE DEVICE AND METHOD FOR OBSERVING PHASE INFORMALITIES

BACKGROUND OF THE INVENTION

1. Field of the Invention

The present invention relates to an interference device and method for observing phase information and, more particularly, to a method for observing phase information using waves with the amplitude difficult to split such as electron beams and an interference device for observing phase information.

2. Description of the Related Art

So far, electron-beam holography has been known and used for observing the image of a very minuscule phase object. The principle will now be explained briefly with reference to FIG. 3. As illustrated, a plane electron wave 1 having high coherence enters along the optical axis, on one side of which a specimen 2 is located. The electron wave 1 then travels through the specimen 2, so that the wavefront can be split into an object wave modulated by the specimen 2 and a reference wave that does not transmit through the specimen 2. These waves are focused once through an electron objective 3 to form an image on an intermediate image-formation surface 5. If there are electron biprisms 4 between the objective 3 and the intermediate image-formation surface 5, then the object wave passing on one side of a centrally located filament and the reference wave on the other side are bent across the optical axis and superposed on each other on the image-formation surface 5 to form interference fringes, which are then magnified through an electron lens 6 to record them on a photographic film 7, thereby producing a hologram 7. On the thus produced hologram 7, the phase of the object wave spatially magnified by the electron lens is recorded in the form of an interference fringe displacement. The recorded phase of the object wave may be measured by interference between the wavefronts of the optically reconstructed hologram 7 and plane waves, for instance. Or, alternatively, the electron-beam hologram may be digitized for reading, so that the phase of the recorded object wave can be measured by transforming the read data by calculation.

As illustrated in FIG. 4, another well-known type of holography may be achieved by use of three crystals 11, 12, and 13. An incident electron beam 1 is diffracted by the crystal 11 to split it into a positive first-order diffracted wave and a negative first-order diffracted wave by amplitude splitting. These positive and negative first-order diffracted waves are then subjected to the negative and positive first-order diffraction through the crystal 12, respectively, so that one of the diffracted waves falls upon the crystal 13 through a specimen 2 and the other strikes the crystal 13 through vacuum. Subsequently, they are again subjected to the − and + first-order diffraction, travel through an electron lens 14, and interfere on an observation surface 15 in a superposed manner, thereby forming a hologram.

The electron-beam holography of FIG. 3 utilizing wavefront splitting has wide practical application, but has drawbacks. For instance, because the interference fringe pattern itself provides no direct representation of the phase distribution of a specimen, it is necessary to reconstruct the equiphase distribution of the specimen from the interference fringe pattern either by optical techniques or by calculation. For achieving wavefront splitting, it is also required to use an electron beam source having high coherence. Moreover, there is the need of providing a vacuum region through which reference waves can travel immediately adjacent to the location of the specimen to be observed. However, large specimens have fuzzy profiles; in other words, they are not well suited for ideal measurement.

The amplitude splitting technique of FIG. 4 has very little practical application, partly because it is difficult to obtain any pure crystal that behaves as theoretically expected, and partly because it is very difficult to achieve crystallographic alignment.

SUMMARY OF THE INVENTION

In view of the problems mentioned above, a primary object of the present invention is to provide a method for observing phase information, using electron beams with an amplitude difficult to split by a half mirror, and an interference device for observing phase information.

The object of the present invention, as mentioned above, is achieved by providing a method for observing phase information, including a lens system and two scattering films capable of scattering incident waves randomly, the scattering films being conjugately coordinated with a specimen located therebetween, comprising the steps of detecting a first interference pattern arising from waves transmitting through both the scattering films;

removing the sepciment from between both the films detecting a second interference pattern; and calculating the difference between both the detected interference patterns, or the sum or product thereof, whereby the phase information of said specimen is observed as interference fringes.

In this case it is desired that the specimen be located at a position where a component going straight through the scattering film on the incident side converges, and both the interference patterns be detected at a position that is conjugately coordinated with respect to the location of the specimen.

The present invention also includes an interference device for observing phase information, which enables the phase information of a specimen to be observable as interference fringes, comprising:

two scattering films capable of scattering incident waves randomly;

a first lens system that is located between said two scattering films to form the image of one scattering film on the other scattering film;

a second lens system for forming on an observation surface the image of the specimen located at a position where a component going straight through said one scattering film is converged through at least a portion of said first lens system; and means for recording an interference pattern formed on the observation surface.

When electron beams are used as the incident waves, it is desired that amorphous films be used as the scattering films.

In accordance with the present invention wherein two scattering films capable of scattering incident waves randomly are conjugately coordinated with a specimen located therebetween, a first interference pattern arising from waves transmitting through both the scattering films is detected, a second interference pattern is detected while the specimen is removed from between both the films and under conditions that are otherwise similar as mentioned above, and the difference between both the detected interference patterns, or the sum or product thereof, is calculated, and the equiphase fringes of the specimen can be observed directly.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

A method for observing phase information and the interference device for observing phase information according to a preferred embodiment of the present invention with reference to the accompanying drawings is described in detailed below.

An electron biprism is indispensable for producing electron-beam interference fringes. In the present invention, however, interference fringes are produced by using two amorphous films in place of, or without recourse to, such electron biprisms. One amorphous film is used to split an electron beam into object and reference waves, and the other is used to bring these two (object and reference) waves back together for interference. More particularly, the object wave is a component that is scattered by the first amorphous film and then goes straight through the second amorphous film, whereas the reference wave is a component that goes straight through the first amorphous film and is then scattered by the second amorphous film. A plurality of lenses together with a specimen are interposed at suitable locations between the first and second amorphous films, whereby the equiphase distribution of the specimen can be directly observed.

Figure 1:
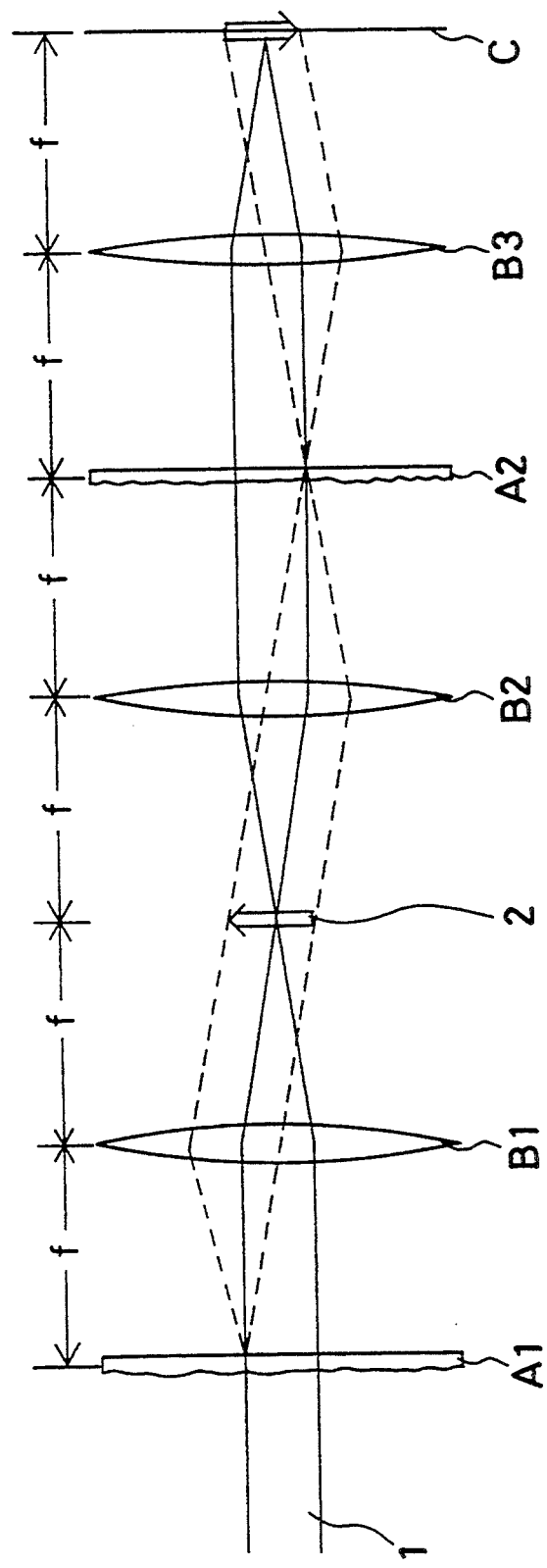
FIG. 1 is a schematic diagram illustrating the principle of observing phase information according to the invention.
Figure 2:
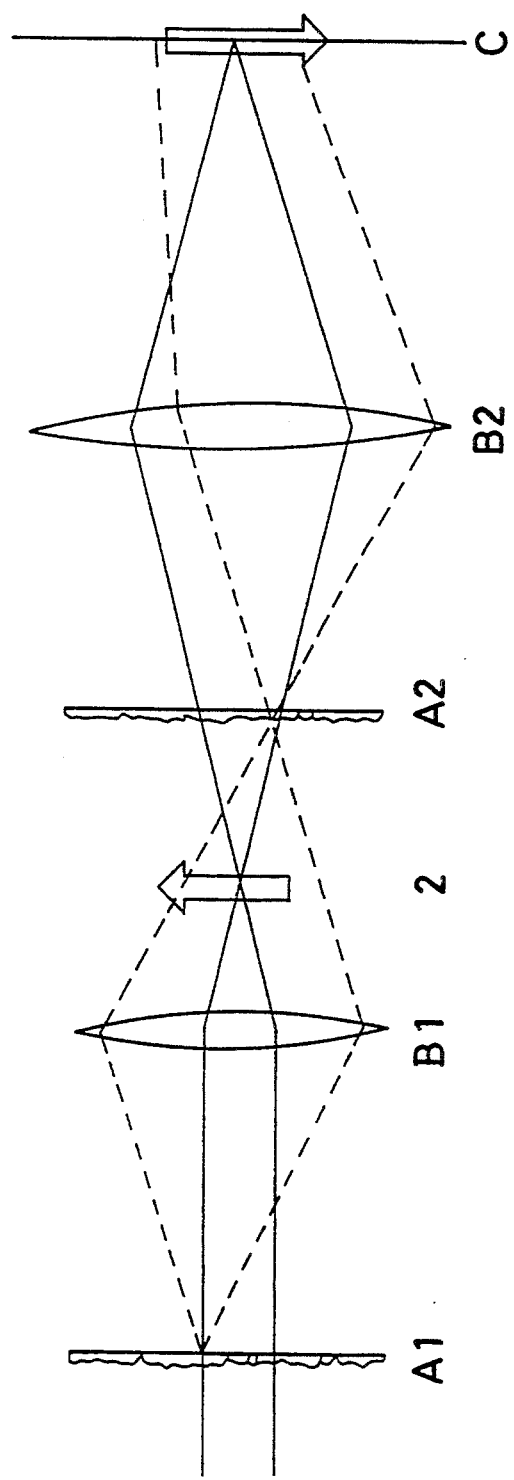
FIG. 2 is a schematic diagram illustrating a modified example.
Figure 3:
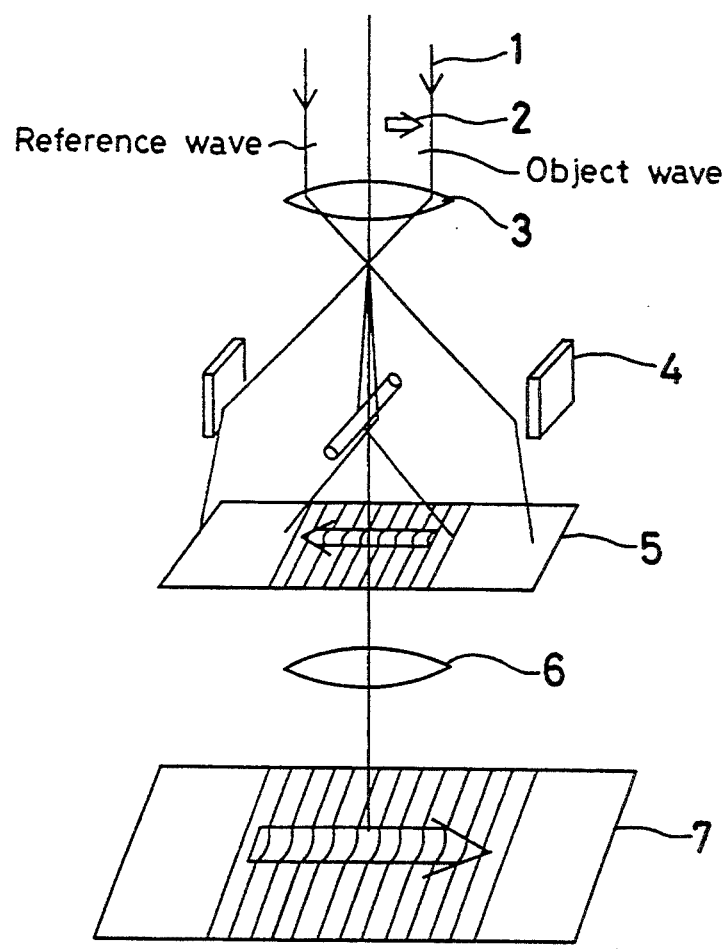
FIG. 3 is a schematic diagram illustrating the principle of a conventional electron-beam holography making use of electron biprisms.
Figure 4:
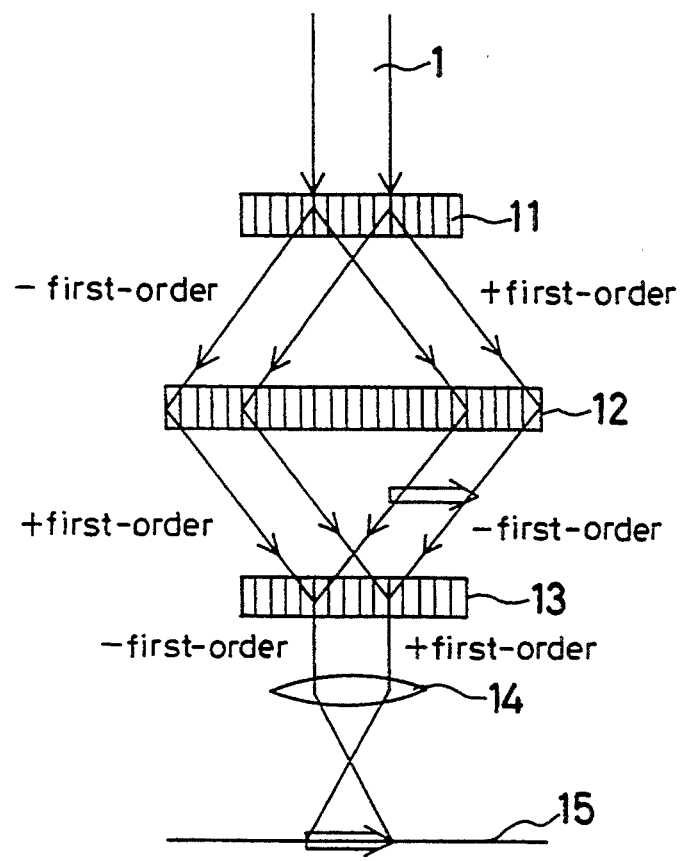
FIG. 4 is a schematic diagram illustrating the principle of a conventional electron-beam holography that is achieved by amplitude splitting using crystals.

The principle of the present invention will now be described with reference to FIGS. 1 and 2. Referring first to FIG. 1, scattering amorphous films A1 and A2 are used together with three electron lenses B1, B2 and B3, each having a focal length f. As can be seen from FIG. 1, the electron lens B1 is located in the rear of the amorphous film A1 and at a distance f from it, and the specimen 2 is located on the back focal surface thereof. Likewise, the electron lens B2 is located in the rear of the specimen and at a distance f from it, and the amorphous film A2 is located on the back focal surface thereof. Similarly, the electron lens B3 is located in the rear of the amorphous film A2 and at a distance f from it, and an observation surface C is defined by the back focal surface of the electron lens B3. Thus, the amorphous films A1 and A2 are conjugately coordinated with each other and the observation surface C provides a surface on which the image of the specimen is formed.

In this arrangement, now suppose that the incident electron beam 1 falls upon the amorphous film A1. The component of the beam that goes straight through the film A1 without being scattered is converged by the electron lens B1 onto a point (reference point) on the specimen surface. Then, this component again diverges with the phase of this point, arrives at the amorphous film A2 lying on the image surface of the amorphous film A1, where it is scattered in all directions, and is brought back together by the electron lens B3 onto the observation surface C that is the image surface of the specimen 2. This component becomes a reference wave. The component that falls upon the amorphous film A1 and scattered there in all directions is brought back together by the electron lens B1 on the specimen surface, arrives at the electron lens B2 with the phase distribution information of the specimen 2, where it converges onto the amorphous film A2, goes straight through the film A2, and is brought back together by the electron lens B3 on the observation surface C. This component becomes an object wave. A minor component that passes straightforward through both the amorphous films A1 and A2 converges onto one point on the observation surface C, as shown by a solid line. Another minor component that is scattered by both the amorphous films A1 and A2 may be ignored because of its small intensity.

The above-mentioned reference and object waves interfere on the observation surface C, so that a random interference pattern—in which a phase difference of each point on the specimen with respect to the phase of the reference point is modulated by a random phase distribution arising from the amorphous films A1 and A2—appears on the observation surface C, and is then recorded.

Then, the specimen 2 is removed from the beams (notice that in the case of observing dynamic changes of the specimen 2, this must be done after such changes occur), a phase information-free interference pattern of the specimen 2, i.e., a random interference pattern consisting only of a random phase distribution arising from the amorphous films A1 and A2, is recorded under the same conditions as mentioned above to, by calculation, find the difference between that random interference pattern and the random interference pattern of the specimen 2 detected when it has existed in the beams, or the sum or product of them.

Let us put this point briefly in mathematical terms. For a wavefront change due to the amorphous film A1, we have exp $(i\phi_1)$ $\doteq 1 + i\phi_1$ (film thickness is small, or $\phi_1 \ll 1$)

For a wavefront change due to the amorphous film A2, we have exp $(i\phi_2)$ $\doteq 1 + i\phi_2$ (film thickness is small, or $\phi_2 \ll 1$)

For a wavefront change due to the specimen 2, we have exp $(i\phi_0)$

Here $\phi_0$, $\phi_1$ and $\phi_2$ each represent a function of coordinates (x, y) vertical to the optical axis. We also have $F[\phi_1] = a_1 \exp(i\alpha_1)$
$F[\phi_2] = a_2 \exp(i\alpha_2)$
$F[\exp(i\phi_0)] = \Phi$ where F is a Fourier transform.

Designating the incident electron beam by 1, we have $1 + i\phi_1$
just after the surface of the amorphous film A1;
$\delta + ia_1 \exp(i\alpha_1)$
just before the surface of the specimen 2;
$\delta \exp(i\phi_0(0, 0)) + ia_1 \exp(i\alpha_1)\cdot\exp(i\phi_0)$
just after the surface of the specimen 2;
$\exp(i\phi_0(0, 0)) + i\phi_1 * \Phi$
just before the surface of the amorphous film A2;
$\{\exp(i\phi_0(0, 0)) + i\phi_1 * \Phi\}\cdot(1 + i\phi_2)$
just after the surface of the amorphous film A2; and
$\{\delta \exp(i\phi_0(0, 0)) + ia_1 \exp(i\alpha_1) \cdot \exp(i\phi_0)\} * \{\delta + ia_2 \exp(i\alpha_2)\} = \delta \exp(i\phi_0(0, 0)) + ia_1 \exp(i(\alpha_1 + \phi_0)) + ia_2 \exp(i(\alpha_2 + \phi_0(0, 0))) - \{a_1 \exp(i(\alpha_1 + \phi_0))\} * \{a_2 \exp(i\alpha_2)\}$
on the observation surface C (the wave function). Here $\delta \exp(i\phi_0(0, 0))$ represents the center spot and so may be ignored. Also, $[a_1 \exp(i(\alpha_1 + \phi_0))] * \{a_2 \exp(i\alpha_2)\}$ represents the component scattered by the amorphous films A1 and A2, and may again be ignored, because it is small.

In other words, when the specimen 2 is placed in the beam 1, the wave on the observation surface C becomes
$ia_1 \exp(i(\alpha_1 + \phi_0)) + ia_2 \exp(i(\alpha_2 + \phi_0(0, 0)))$
Then, the intensity of the wave is found by the square of this; that is,
$a_1^2 + a_2^2 + 2a_1a_2 \cos[\alpha_1 - \alpha_2 + \phi_0 - \phi_0(0, 0)]$ (1)
Here $(\alpha_1 - \alpha_2)$ is a random component on the basis of the phases of the amorphous films A1 and A2, which is spatially randomly distributed; in other words, the intensity of this component is spaticily random.

When the specimen 2 is removed from the beam 1, the intensity of the wave on the observation surface C has the form
$a_2^2 + a_2^2 + 2a_1a_2 \cos(\alpha_1 - \alpha_2)$ (2)
Therefore, the difference between the intensity (1) when the specimen 2 exists and the intensity (2) when the specimen 2 does not is given by $2a_1a_2\{\cos[\alpha_1 - \alpha_2 + \phi_0 - \phi_0(0,0)] - \cos(\alpha_1 - \alpha_2)\} =$ $-4a_1a_2\sin\{\alpha_1 - \alpha_2 + [\phi_0 - \phi_0(0,0)]/2\} \times \sin\{[\phi_0 - \phi_0(0,0)]/2\}$ since $a_1$ and $a_2$ are virtually uniform and $\alpha_1$ and $\alpha_2$ are random, this is the phase distribution of the specimen 2, $\sin\{[\phi_0 - \phi_0(0, 0)]/2\}$, subjected to random modulation $\sin\{\alpha_1 - \alpha_2 + [\phi_0 - \phi_0(0, 0)]/2\}$, providing a direct representation of the phase distribution of the specimen 2 in the form of contour lines (interference fringes).

The sum of the intensity (1) when the specimen 2 exists and the intensity (2) when the specimen 2 does not is $2(a_1^2 + a_2^2) + 4a_1a_2\cos\{\alpha_1 - \alpha_2 +$
$[\phi_0 - \phi_0(0,0)]/2\} \times \cos\{[\phi_0 - \phi_0(0,0)]/2\}$ The phase distribution of the specimen 2 is presented by:
$\cos\{[\phi_0 - \phi_0(0, 0)]/2\}$
Although small in terms of sensitivity, even such summation provides a direct representation of the phase distribution of the specimen 2 in the form of contours.

The product of the intensity (1) when the specimen 2 exists and the intensity (2) when the specimen 2 does not is $2a_1a_2\cos[\alpha_1 - \alpha_2 + \phi_0 - \phi_0(0,0)] \times \cos(\alpha_1 - \alpha_2) =$ -continued
$2a_1^2a_2^2\{\cos[2\alpha_1 - 2\alpha_2 + 2\phi_0 - 2\phi_0(0,0)] + \cos\{\phi_0 - \phi_0(0,0)]\}$ Here, too, $\cos[\phi_0 - \phi_0(0, 0)]$ represents the contour lines of the phase distribution of the specimen 2.

It is understood that the intensity distribution when the specimen 2 exists or does not may be measured by either photoelectric transformation or photographic means. Also, the difference between the intensities, or the sum or product of them may be calculated either electronically or photographically. Notice that some difficulty is involved in doing subtraction photographically. To do summation, film is once exposed to light at the time when the specimen exists. After removal of the specimen, the film is again exposed to light (double exposure), followed by development. To do multiplication, one film is exposed to light and developed at the time when the specimen exists. After removal of the specimen, another film is similarly exposed to light and developed. Then, both the films are superposed on each other to see the distribution of the light transmitted.

While the invention has been described with reference to the situation where Fraunhofer diffraction holds, it is understood that the invention maps neatly onto the case where Fresnel diffraction holds as well. Hence, such an arrangement shown in FIG. 2 may be used for observation in place of the arrangement shown in FIG. 1. In this case the amorphous films A1 and A2 are conjugately coordinated with each other, with a single electron lens B1 located between them. A specimen 2 is then located on the back focal surface of the electron lens B1. An observation surface C here is defined by the position at which another electron lens B2 located in the rear of the amorphous film A1 is coordinated with the specimen 2. Observation and calculation may be achieved in the same manner as explained with reference to FIG. 1.

It is noted that the scattering films A1 and A2 may be made up of any desired material having a random distribution. Throughout the specification, the term "random" is understood to mean that, by Fourier transform, the distribution is made constant in terms of amplitude with a random phase. In the case of electron beams, an amorphous film prepared by the vapor deposition of, e.g., carbon or germanium in medium vacuum is found to conform relatively to this requirement and so be suitable for the invention. While the invention has been described with reference to the use of electron beams whose amplitude is difficult to split, it is understood that the invention may be equally applicable to X-rays, light, sound waves, etc.

In accordance with the invention wherein two scattering films capable of scattering incident waves randomly are conjugately coordinated with a specimen located therebetween, a first interference pattern arising from waves transmitting through both the scattering films is detected, a second interference pattern is detected while the specimen is removed from between both the films and under conditions that are otherwise similar as mentioned above, and the difference between both the detected interference patterns, or the sum or product thereof, is calculated, the equiphase fringes of the specimen can be observed directly. The application of the invention to electron beams poses several advantages over the prior art. Among them:

There is no need for providing a vacuum region for reference waves (this is advantageous for measuring a magnetic field having a continuous distribution).

Direct and real-time observation is achievable (with no need of reconstruction).

Even with an electron beam source poor in coherence, interference fringes can be obtained.

What we claim is:

1. A method for observing phase information, including a plurality of lenses and two scattering films capable of scattering incident waves randomly said scattering films being conjugately coordinated with a specimen located therebetween, the method comprising the steps of:

detecting a first interference pattern arising from waves transmitting through both the scattering films;

removing the specimen from between both of the films; detecting a second interference pattern; and calculating the difference between the first and second detected interference patterns, or the sum or product thereof whereby the phase information of the specimen is observed as interference fringes.

2. A method according to claim 1, wherein the specimen is located at a position where a component going straight through the scattering film on the incident side converges, and both the interference patterns are detected at a position that is conjugately coordinated with the location of the specimen.

3. An interference device for observing phase information which enables phase information of a specimen to be observable as interference fringes, comprising:

first and second scattering films capable of scattering incident waves randomly, said scattering films located conjugately on either side of said specimen;

a first lens system that is located between said scattering films to form the image of said first scattering film on said second scattering film;

a second lens system for forming on an observation surface the image of a specimen located at a position where a component going straight through said first scattering film is converged through at least a portion of said first lens system; and means for recording an interference pattern formed on said observation surface.

4. An interference device according to claim 3, wherein the incident waves are electron beams and the first and second scattering films consist of amorphous films.

* * * * *